(12) United States Patent
Dal Pra'

(10) Patent No.: US 7,610,832 B2
(45) Date of Patent: Nov. 3, 2009

(54) BICYCLE COMPONENT AND METHOD FOR MAKING SUCH A COMPONENT

(75) Inventor: Giuseppe Dal Pra', Zane (IT)

(73) Assignee: Campagnolo S.r.l., Vicenza (IT)

( * ) Notice: Subject to any disclaimer, the term of this patent is extended or adjusted under 35 U.S.C. 154(b) by 325 days.

(21) Appl. No.: 10/863,567

(22) Filed: Jun. 8, 2004

(65) Prior Publication Data

US 2005/0016323 A1    Jan. 27, 2005

(30) Foreign Application Priority Data

Jun. 10, 2003    (EP) .................................. 03425367

(51) Int. Cl.
    *B62M 3/02*    (2006.01)
(52) U.S. Cl. ..................................... 74/594.1
(58) Field of Classification Search ............... 74/594.1, 74/594.2, 594.3, 594.4, 594.5, 594.6, 594.7; 411/393, 395, 402, 412
See application file for complete search history.

(56) References Cited

U.S. PATENT DOCUMENTS

| | | | | |
|---|---|---|---|---|
| 2,371,365 | A * | 3/1945 | Tomalis et al. ............... | 411/310 |
| 3,061,455 | A * | 10/1962 | Anthony ...................... | 411/258 |
| 3,687,493 | A * | 8/1972 | Lock et al. .................. | 285/333 |
| 3,701,372 | A * | 10/1972 | Breed .......................... | 411/309 |
| 4,237,948 | A * | 12/1980 | Jones et al. .................. | 411/307 |
| 5,435,869 | A |  7/1995 | Christensen | |
| 5,586,472 | A * | 12/1996 | Lin ............................. | 74/594.1 |
| 6,074,147 | A * | 6/2000 | Shu ............................. | 411/393 |
| 6,202,506 | B1 |  3/2001 | Storck et al. | |
| 6,276,885 | B1 * | 8/2001 | Yamanaka ................... | 411/403 |
| 6,415,684 | B1 * | 7/2002 | Yamanaka ................... | 74/594.1 |
| 6,540,619 | B2 * | 4/2003 | Kato ............................ | 470/11 |
| 6,564,675 | B1 |  5/2003 | Jiang | |
| 6,568,296 | B1 * | 5/2003 | Lin ............................. | 74/594.1 |
| 6,874,387 | B2 * | 4/2005 | Vaughn ....................... | 74/594.1 |
| 7,070,376 | B1 * | 7/2006 | Toback ....................... | 411/82.2 |
| 7,080,574 | B2 * | 7/2006 | Chang ........................ | 74/594.1 |
| 2003/0061900 | A1 * | 4/2003 | Smith ......................... | 74/594.1 |
| 2003/0106393 | A1 * | 6/2003 | Lin ............................. | 74/594.1 |
| 2005/0178236 | A1 * | 8/2005 | Crozet et al. ............... | 74/594.1 |

FOREIGN PATENT DOCUMENTS

| | | | |
|---|---|---|---|
| DE |     19601125 A1 | * | 7/1997 |
| DE |     197 55 950 A1 | | 6/1999 |
| EP |     0 270 388 | | 6/1988 |
| EP |     03425367.4 | | 6/2003 |

* cited by examiner

*Primary Examiner*—Vicky A Johnson
(74) *Attorney, Agent, or Firm*—Volpe and Koenig, P.C.

(57) ABSTRACT

A pedal crank for a bicycle comprising structural fibers incorporated in a matrix of polymeric material which has two seats in which two metal inserts are received. The seats have a mouth which opens onto the outer surface of the pedal crank and have a geometry such as to allow the insertion of the inserts from outside of the pedal crank.

37 Claims, 7 Drawing Sheets

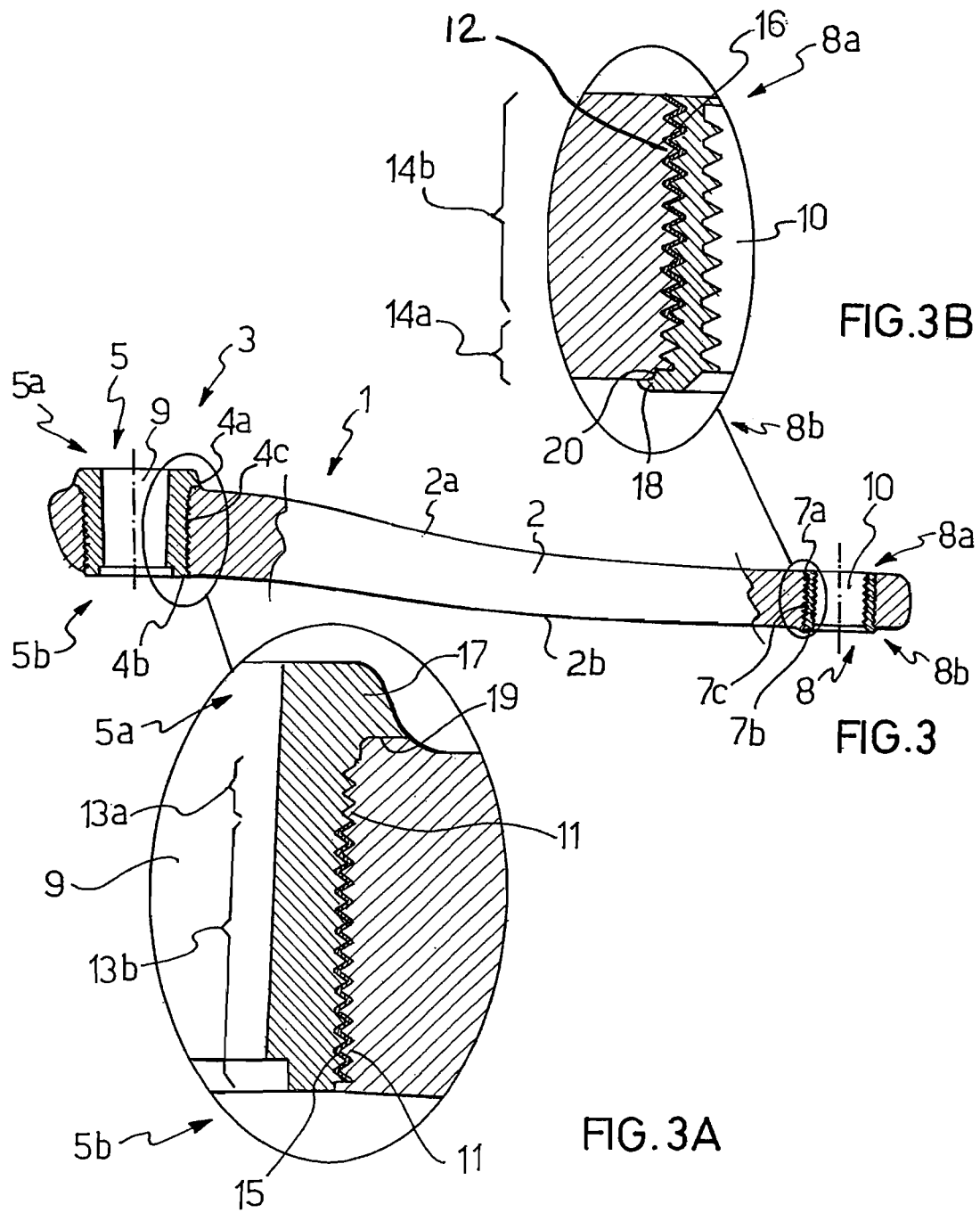

BICYCLE COMPONENT AND METHOD FOR MAKING SUCH A COMPONENT

BACKGROUND

The prior art shows different types of pedal cranks made with different shapes, materials and constructive techniques. Each of these has the same goals: reduce the weight as much as possible and at the same time ensure, if not even improve, the characteristics of strength and reliability of the pedal crank.

The goal of manufacturing lighter pedal cranks has led to the use of composite materials having low specific weight. Nevertheless, while the pressures occurring in the use of the pedal crank remain unaltered, specifically the torsion forces due to the thrusting action of the cyclist during pedaling, it becomes necessary to insert metal elements that act as an interface between the bottom bracket pivot, or pedal pivot, with the pedal crank body.

One lighter pedal crank is shown in EP 1 281 609 assigned to Campagnolo S.r.l., wherein the pedal crank body is obtained by molding a thermosetting composite material inside a mould in which metal inserts are arranged. During the molding step, the composite material in plastic state is arranged to cover the inserts, coating them for most of their outer surface, except for a short portion in correspondence with support elements to which the inserts are fixed. Such support elements advantageously act as extractor elements. The material thus arranged inside the mould is heated up to its hardening after which the pedal crank can be removed from the mould by activating the extractor elements. The pedal crank then undergoes cooling down to room temperature. In the end configuration the inserts are substantially incorporated inside the material with which the pedal crank body is made.

During the aforementioned cooling step, however, the problem is that the composite material coats the insert and tends to detach from the walls of the insert itself. During cooling, both the insert's metal material and the pedal crank's composite material shrink. The detachment process is even more critical when the cooling coefficient of the two materials is different. Such a detachment means a decrease in adherence between the metal insert and the composite material, with a consequent decrease in the strength properties and the breaking strength of the pedal crank as a whole.

A second solution which uses metal inserts in a pedal crank body of composite material is shown in patent U.S. Pat. No. 6,202,506 B1. In such a solution the metal insert has, on the outer surface, a series of shaped discs which are spaced apart and incorporated in the composite material of which the pedal crank body is made. Such a manufacture, while increasing the contact surface between insert and composite material, is still problematic due to the partial detachment between the material of the pedal crank body and the insert, this being a phenomenon which appears during the hardening step of the material.

SUMMARY

The present invention seeks to overcome the problems discussed above and improve bicycle parts as a whole. A bicycle component comprising a body made from structural fibers incorporated in a matrix of polymeric material comprises at least one seat, an opening, at least one metal insert that engages the seat. The opening comprises a mouth at a first end of the opening; a base at a second end of the opening opposite the first end being of a size not greater than the size of the mouth end; and walls with cross-sections that do not increase from the mouth to the base. The body is adapted to mechanically couple with at least one element of the bicycle to transmit force.

BRIEF DESCRIPTION OF THE DRAWING(S)

Further characteristics and advantages of the invention shall become clearer from the Detailed Description which makes reference to the following Figures.

FIG. 3 is a partial section view of FIG. 1 along the axis III°-III° of FIG. 1.

FIG. 3A is an enlarged detail of FIG. 3.

FIG. 3B is another enlarged detail of FIG. 3.

DETAILED DESCRIPTION OF THE PREFERRED EMBODIMENT(S)

Figure 1:
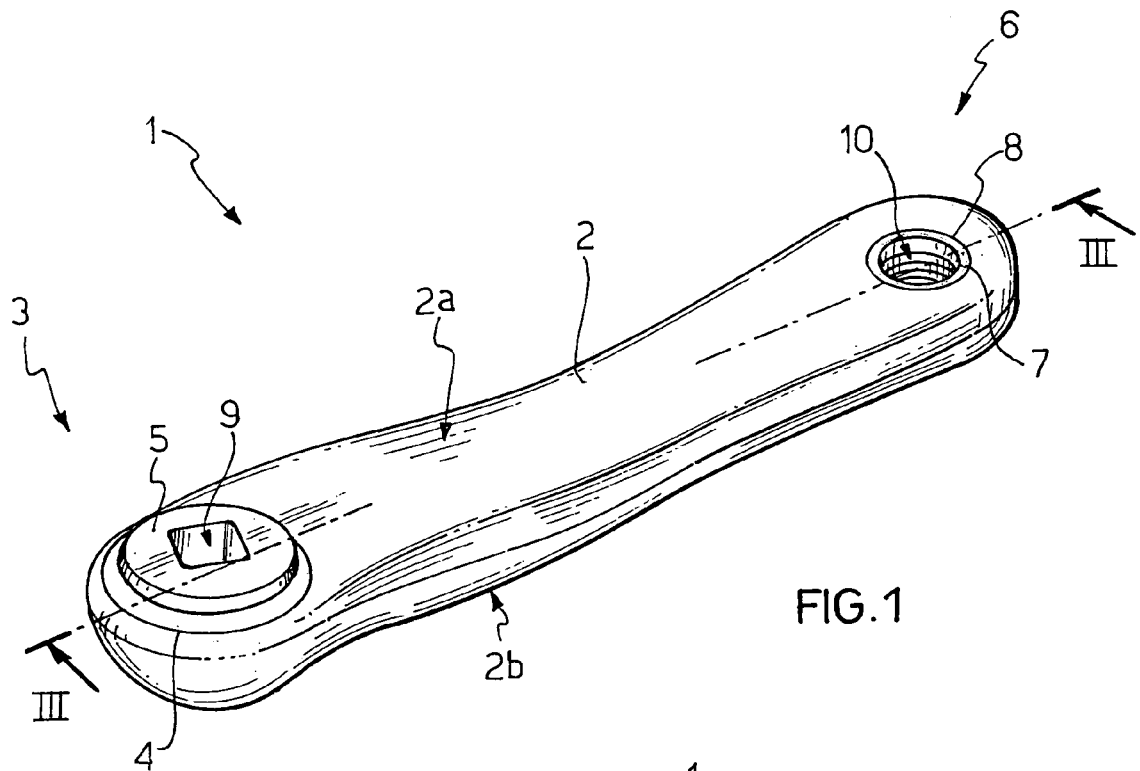
FIG. 1 is an isometric view of the component according to the invention.
Figure 2:
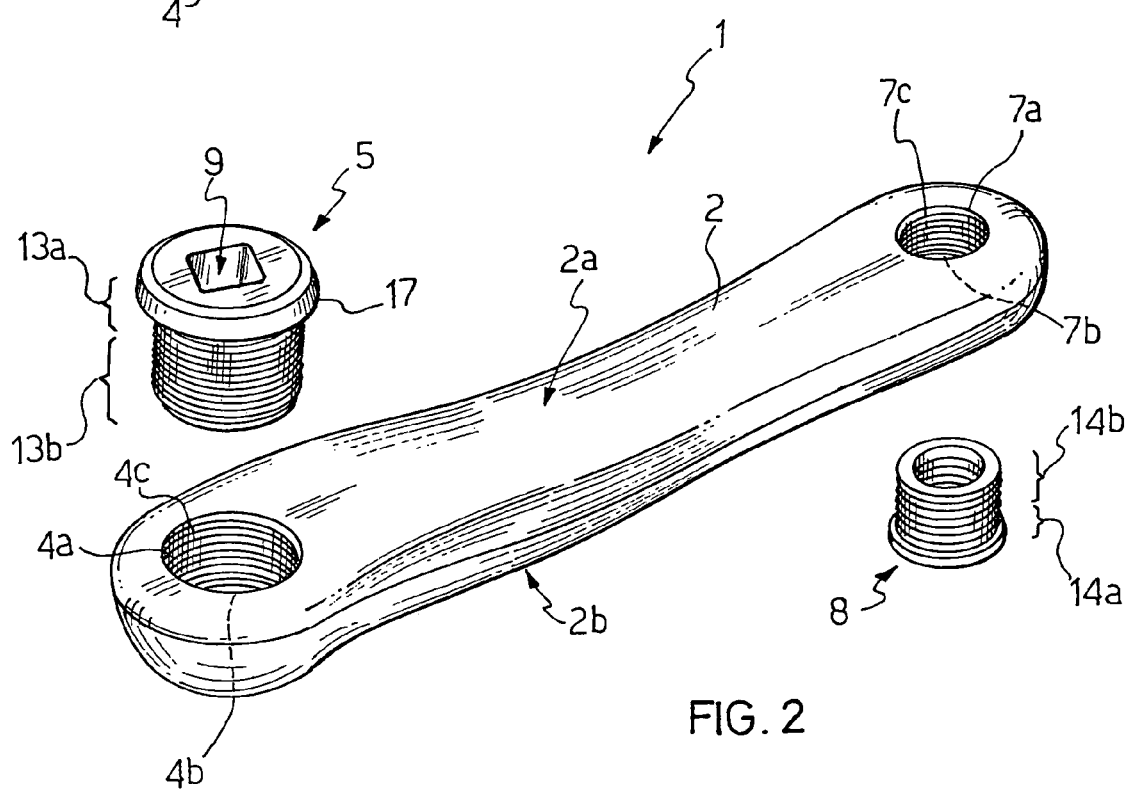
FIG. 2 is an exploded view of FIG. 1.

In FIGS. 1 to 3, the component 1 comprises a pedal crank for bicycles. The term pedal crank as used herein is general and generally should be understood to mean a bicycle component with characteristics similar to those of a pedal crank, like for example a saddle post, fork, handlebars, gearshift, or brakeshift. In general, it can be considered that such a component is subjected to at least one force component, for example traction, compression and/or torsion, and is able to transmit or else withstand such a force.

The pedal crank comprises an elongated body 2 which has, at the end 3, a first seat 4 where a first metal insert 5 is received for the attachment of the pedal crank 1 to the bottom bracket pivot of the bicycle (pedal not shown). At the opposite end 6 there is a second seat 7 where a second metal insert 8 is received for the connection of a pedal (not shown).

The two inserts 5, 8 have throughholes 9, 10 for the connection, respectively, to the bottom bracket pivot and to the pedal pivot. The through hole 9 is square for the connection to the bottom bracket pivot whereas the through hole 10 is threaded for the connection to the threaded pedal pivot. It should be clear that in different embodiments the connection holes may not be throughholes and may have a different geometric profile, matching the shape of bottom bracket and pedal pivots.

The body 2 is made from structural fibers incorporated in a thermoplastic or thermosetting resin matrix, whereas the inserts 5, 8 are metal material and preferably an aluminum alloy. The structural fibers are preferably, but not necessarily, carbon fibers arranged in a random manner inside the matrix.

Alternatively, the structural fibers can be arranged in an ordered way inside the mold, for example according to a unidirectional configuration. For example, the fibers may be aligned in one direction near areas under high stress. Alternately, the fibers may be weaved in the form of fabric, to create layers with desired characteristics along particular directions. The structural fibers can finally be chosen from the group comprising glass fibers, aramidic fibers, ceramic fibers or any combination thereof.

As can be seen in FIGS. 2, 3, 3A and 3B, each seat 4, 7 has a mouth 4a, 7b which opens onto the surface 2a, 2b of the body 2 of the pedal crank 1, a base 4b, 7a and walls 4c, 7c. The shape of such seats 4, 7 is substantially cylindrical therefore the size of the mouths 4a, 7b is substantially equal to the size of the respective bases 4b, 7a, whereas the walls 4c, 7c define, from the mouth 4a, 7b to the base 4b, 7a, identical circular sections.

The seat 4, 7 and the insert 5, 8 have matching cylindrical coupling surfaces, on which respective threadings are formed. The seat 4, 7 is a threaded hole 11, 12 whereas the insert 5, 8 has a portion thereof 13, 14 shaped like a screw.

The insert has a first coupling zone 13a with contact threads that have an average, outer and core diameter greater than those of the threads of the second zone 13b, as is best seen in FIG. 3A. The threaded portion 13 of the insert 5 has a first coupling zone 13a without clearance with the threaded hole 11 and a second coupling zone 13b that has clearance between its threads and those of the threaded hole 11. This clearance defines an interspace zone 15. Such an interspace 15 has a substantially uniform thickness, advantageously between 0.1 and 0.05 mm, and is filled with gluing substance to secure the insert 5 within the seat 4.

The insert 5 also has a widened head portion 17 that abuts against the circular contact surface 19 formed in the main body 2. The insert 5 also has a square through hole 9 for coupling with a bottom bracket pivot.

FIG. 3B shows the opposite end of the body 2 from that shown in FIG. 3A. At this end, the insert 8 is adapted to connect to the pedal pivot (not shown). The insert 8 has a first coupling zone 14a without clearance that consists of three contact threads which have an average, outer and core diameter that are greater than those of the threads of the second zone 14b. Similar to the mating engagement of the insert 5 and the threaded hole 11, the screw shaped portion 14 of the insert 8 has a first coupling zone 14a without clearance with the threaded hole 12 and a second coupling zone 14b that has clearance between the threads of the threaded hole 12. This clearance defines an interspace zone 16. The interspace 16 has a substantially uniform thickness, advantageously between 0.1 and 0.05 mm, and is filled with gluing substance.

The insert 8 also has a widened head portion 18 that abuts against the circular contact surface 20 formed in the main body 2. The insert 8 also has a threaded through hole 10 for coupling with the pedal pivot.

It should be noted that the two inserts 5, 8 are screwed into the body 2 of the pedal crank 1 on its opposite surfaces 2a, 2b preferably screwed in with a counter-clockwise motion. This counter-clockwise threading facilitates an advantageous twisting screwing action of the inserts 5, 8 into the respective seats 4, 7 during pedaling.

Figure 3C:
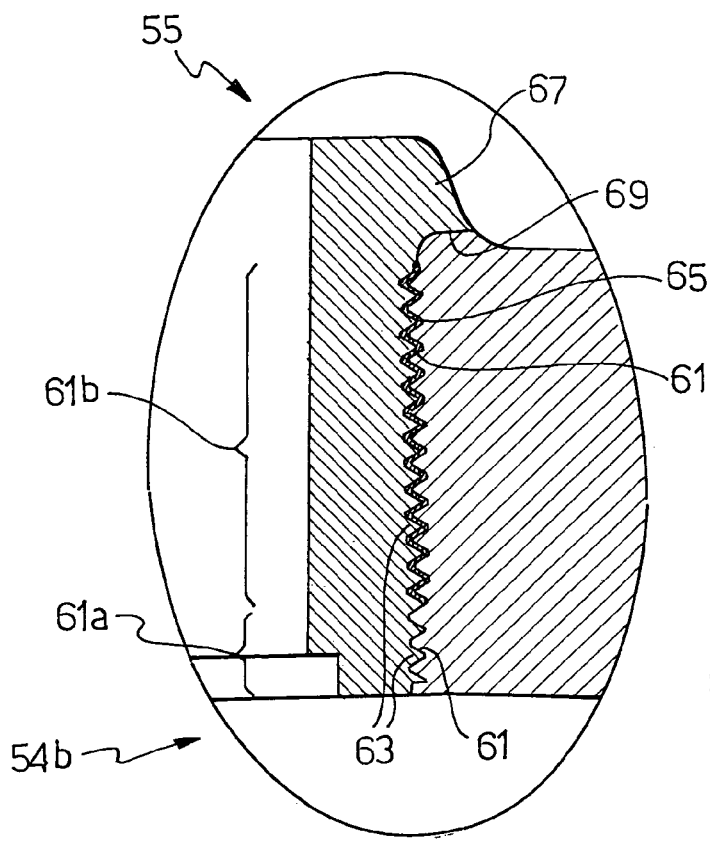
FIG. 3C is an alternate variant embodiment of the detail of FIG. 3A.

FIG. 3C shows an alternate embodiment of the screw-threaded hole type coupling between an insert and seat. This embodiment differs from the previous one in that the threaded hole 61 has a first coupling zone 61a without clearance with the threaded portion 63 of the insert 55, and a second coupling zone 61b spaced apart from the screw 63 that defines an interspace 65. The first zone 61a consists of three contact threads which have an average, outer and core diameter that are smaller than those of the threads of the second zone 61b. The first zone 61a is near to the base 54b of the seat 54. The insert 55 also has a widened head portion 67 that abuts against the contact surface 69 formed in the main body 2.

Figure 4:
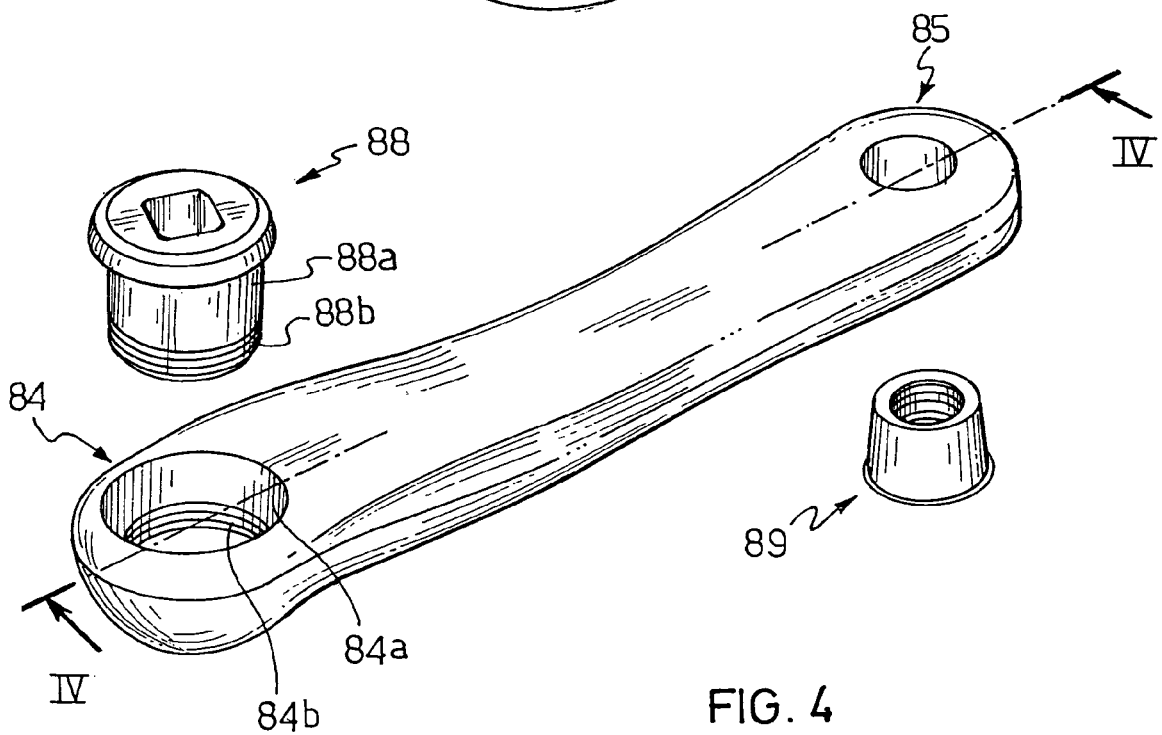
FIG. 4 is an exploded isometric view of a variant of the component of the invention.
Figure 5:
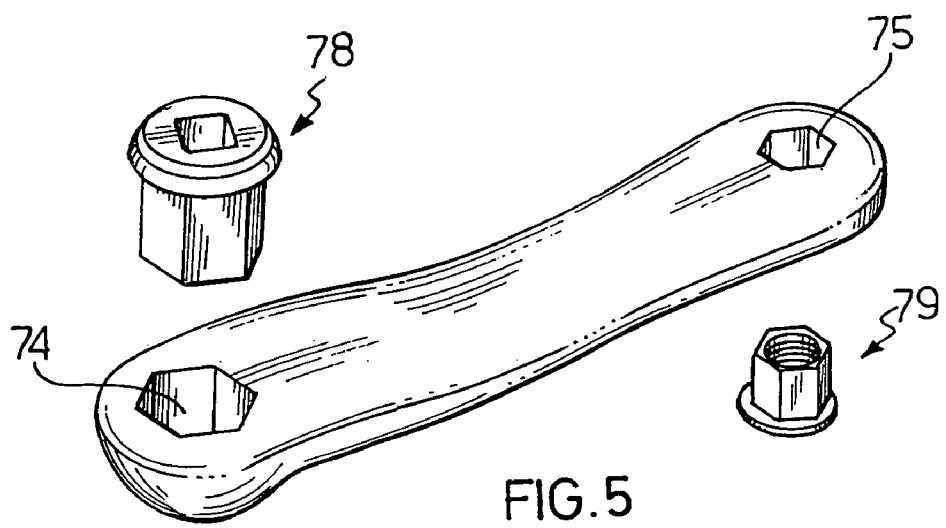
FIGS. 5 and 6 represent exploded isometric views of further variants of the component of the invention.
Figure 6:
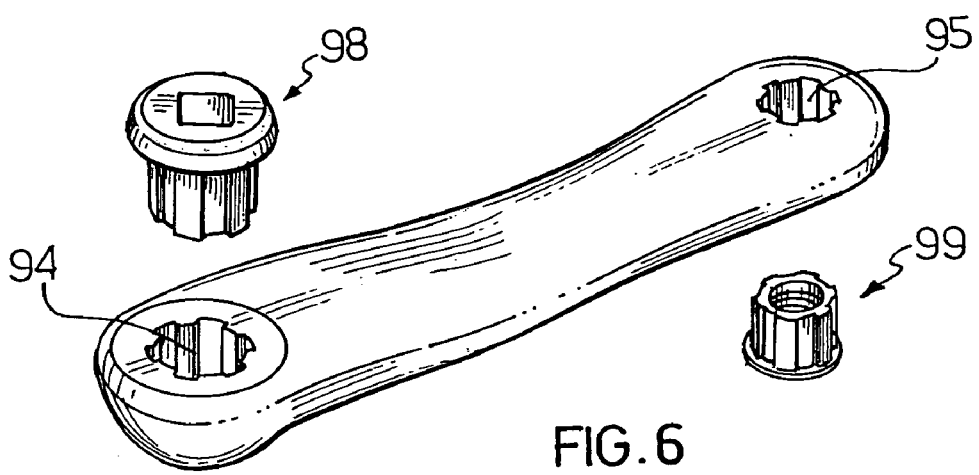

FIGS. 4, 5 and 6 represent different variants of the pedal crank described and differ from it in that the seat and the insert have different external profiles, which all have an interspace for receiving gluing substances.

Figures 4A, 4B, 4C:
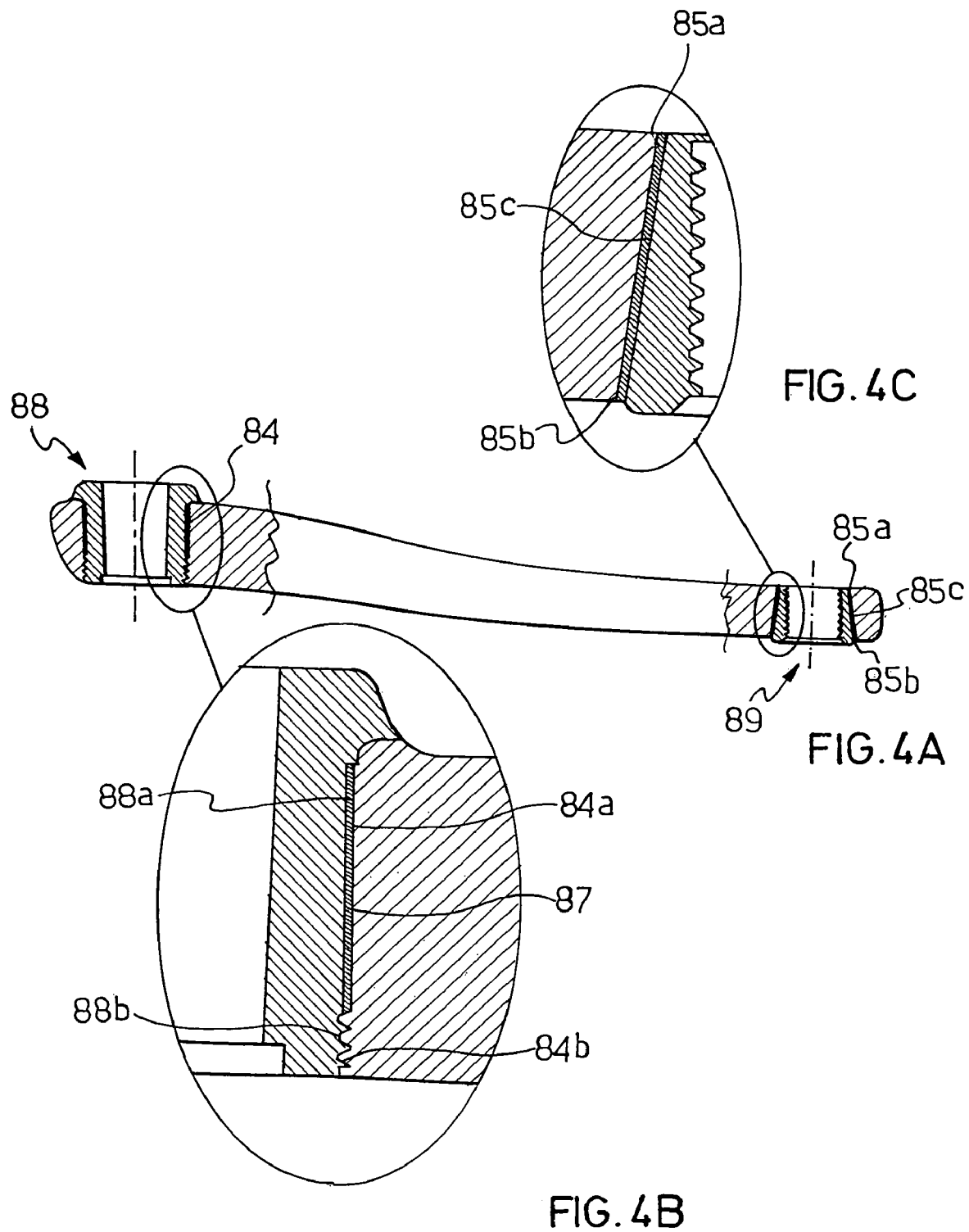
FIG. 4A is a partial section view along the axis IV°-IV° of FIG. 4.
FIG. 4B is an enlarged detail of FIG. 4A.
FIG. 4C is another enlarged detail of FIG. 4A.

FIG. 4 shows a pedal crank with the insert 88 and the respective seat 84 associated with the central movement that is different from the insert 89 and the respective seat 85 associated with the pedal. This difference is best seen in FIGS. 4B and 4C. In FIG. 4B, the seat 84 has a first cylindrical portion 84a and a threaded end portion 84b. The associated insert 88, has a threaded portion 88b which couples with the threaded portion 84b of the seat 84 and a cylindrical portion 88a with a slightly smaller diameter than the diameter of the cylindrical portion 84a of the seat 84. This defines an interspace zone 87 where the gluing substance is advantageously received.

By contrast, the seat 85 and its associated insert 89 have a slightly tapered cylindrical shape as shown in FIG. 4C. The base 85a of the seat 85 is smaller in size than the mouth 85b, whereas the walls 85c define sections whose size decrease from the mouth 85b to the base 85a.

FIG. 5 shows a pedal crank 72 with a seat 74, 75 and associated tapered inserts 78, 79 that have a hexagonal section.

FIG. 6 shows a pedal crank 92 in which each seat 94, 95 and the associated insert 98, 99 are cylindrically shaped with the contact surfaces grooved longitudinally to improve the torsional hold of the insert 98, 99 within the seat 94, 95.

It should be noted that the different geometry of the inserts and of the seats gives a different distribution of the forces, especially of the torsional type, during pedaling. During the design process, the goal of this is to design the profiles so as to suitably distribute the mechanical stresses between the body of the pedal crank and the insert to minimize the shearing stress placed on the gluing substance between them.

Figure 7:
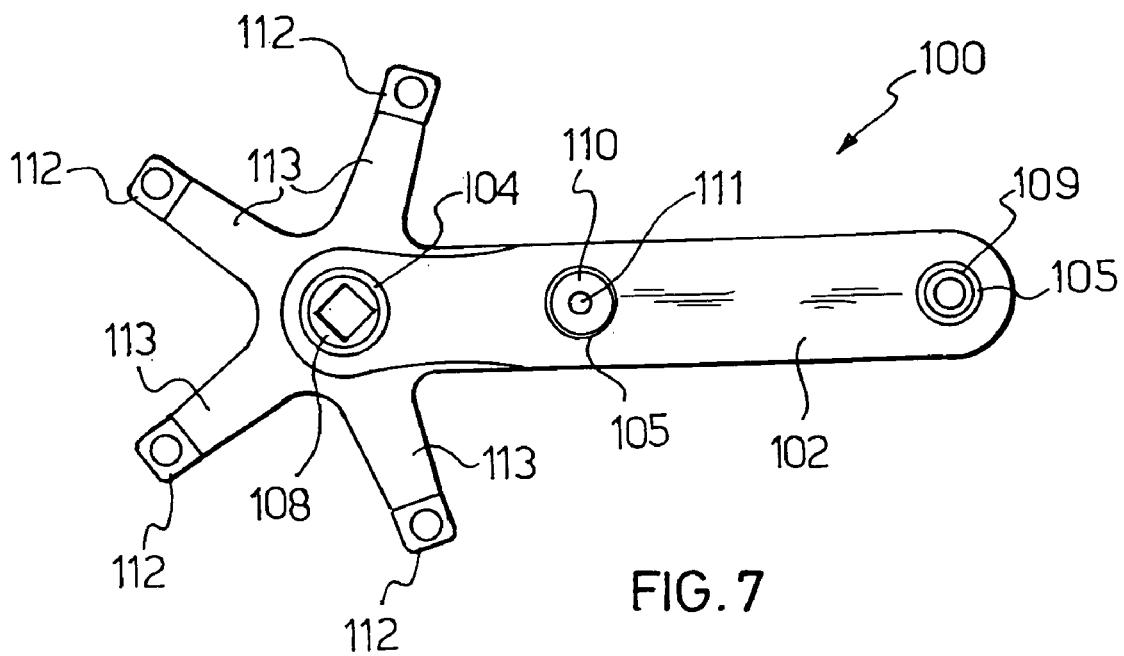
FIG. 7 represents an isometric view of another variant embodiment of the component of the invention.

FIG. 7 represents a variant of the pedal crank of FIG. 1 and consists of a pedal crank 102 with spokes 100, commonly known as right pedal crank, with which one or more crowns (not represented) are associated to drive the chain.

In the embodiment shown in FIG. 7, the pedal crank body 102 has, at one end, a first seat 104 where a first insert 108 is received for the connection to the center of the crank and at the opposite end, a second seat 105 where a second insert 109 is received for the connection to a pedal. The first and second insert 108, 109 are preferably, but not necessarily, of the type described in FIG. 1.

The pedal crank body 102 also comprises a third seat 115 and a third insert 110, of the same type as those described in the previous Figures, arranged in an intermediate position between the first insert 108 and the second insert 109. The third seat 115 and the third insert 110 are used for the anchoring of the crown which is mounted integral to the pedal crank 100. For such a purpose a blind threaded hole 111 attaches to the crown is formed on the third insert 110.

The pedal crank 100 also has, at one end, four arms 113, or spokes, at the ends of which respective seats 112 are formed which allow the locking of the crown at the four points preferably using a threaded screw or bolt. Preferably, the arms 113 and the pedal crank body 102 constitute a single body made of structural fibers incorporated in a matrix of polymeric material, for example a thermosetting or thermoplastic resin.

In another embodiment, the seats 112 can be of a size and shape to receive respective metal inserts, of the type described above, in such a case to define four anchoring points for the crown to the pedal crank body 102 with metal inserts.

In other embodiments which have neither been described nor represented, the pedal crank could be equipped with seats with different geometries, for example any combination of the shapes shown in FIGS. 4 to 6.

In other embodiments, the insert itself could be of a different shape with respect to the seat in which it is received, for example providing a triangular shaped tapered insert received in any non-cylindrical shaped seat.

In another embodiment, the insert-seat coupling could be made without the interposition of gluing substance, in such a case the hold being ensured only by the mechanical interference between the two parts. Furthermore, the seat could be blind and not engage the body for its entire length like for the shapes illustrated above. Or the seat could engage the threaded hole and leave no interspace zone.

Figure 8:
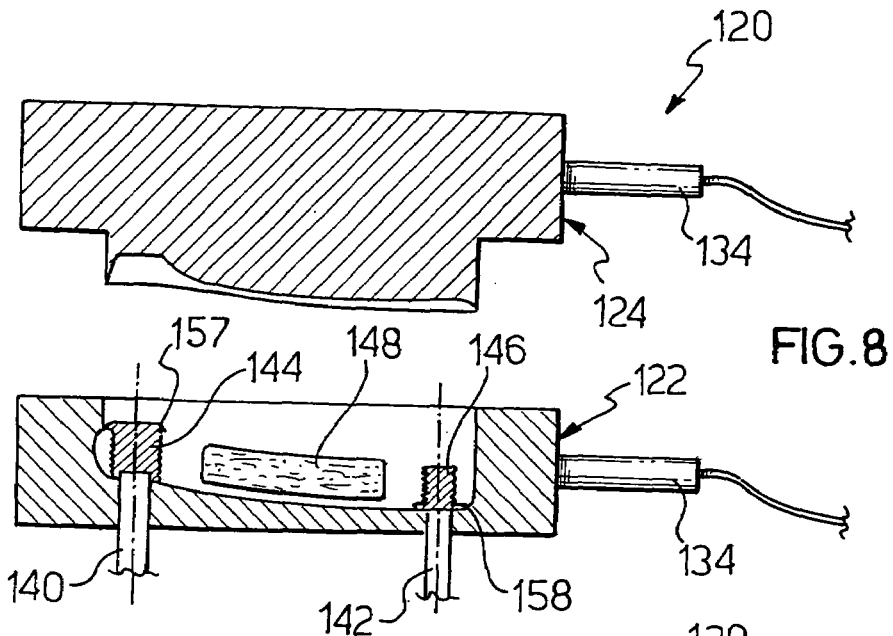
FIGS. 8 to 11 represent the different steps for making the component of FIG. 1 according to a preferred embodiment of the method of the invention.
Figure 9:
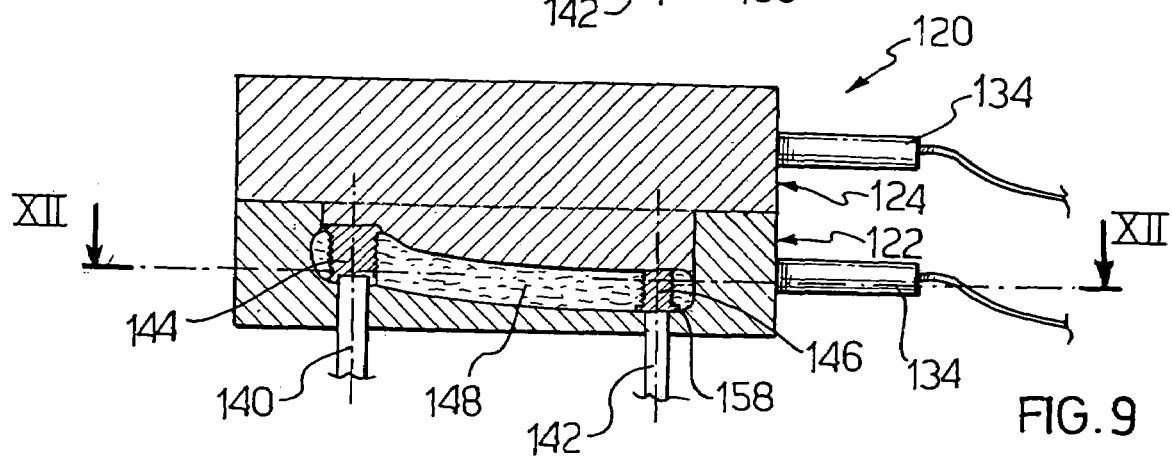

FIGS. 8 to 11 show the steps for obtaining a pedal crank of the type described and represented in FIG. 1, and according to another embodiment. As shown in FIG. 8, a predetermined amount of polymeric material incorporating structural fibers 148 is arranged inside a first half 122 of a mold 120. Inside such a first half 122, two master elements 144, 146 are coated with a detachment-enhancing substance and kept in position by two support elements 140, 142, which also act as extractor elements. The master elements 144, 146 are threaded inserts equipped with a widened head 157, 158 with a profile that mirrors the shape of the seats 4, 5 to be obtained in the pedal crank 1.

Figure 12:
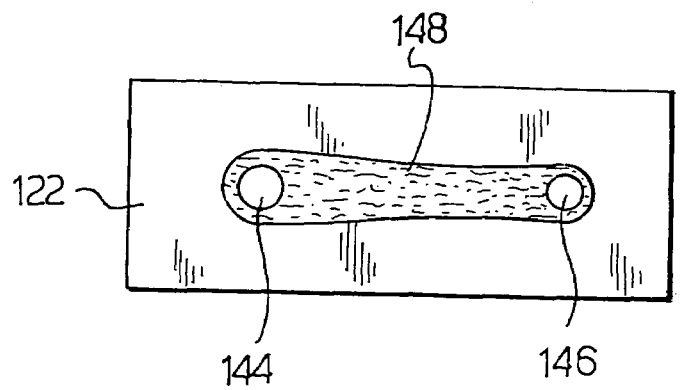
FIG. 12 represents a view according to the section line XII-XII of FIG. 9.
Figure 10:
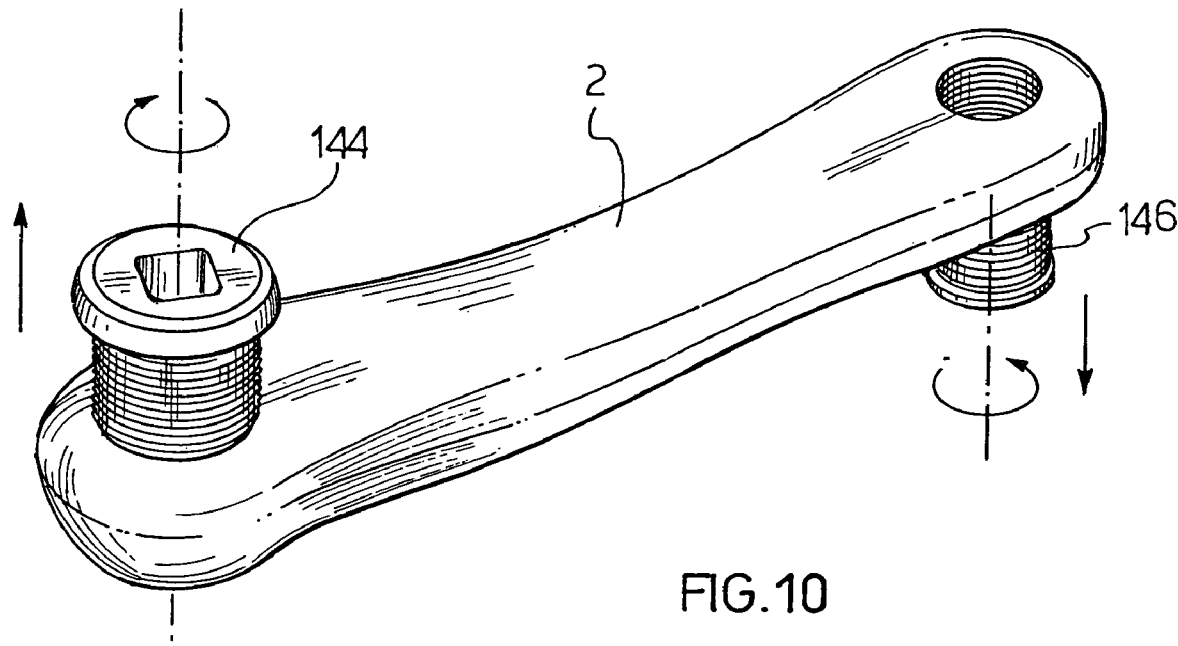

In the subsequent step, the second half 124 of the mould 120 is closed on the first half 122, making the material 148 flow inside the recess defined by the two halves 122, 124 of the mould 120. The material 148 in plastic state completely fills the cavity and completely surrounds the master elements 144, 146, as it can be seen in FIG. 12, with the exception of the widened heads 157, 158 which, the top of which are not coated with any material.

The subsequent heating of the mold 120, through suitable known heating means 134, allows the hardening and the reticulation of the polymeric material and the relative shaping of the pedal crank body 2 according to the desired shape.

The mold 120 is then opened and the pedal crank body 2 is removed by means of the extractor elements 140, 142. The master elements 144, 146, as stated, have the widened heads 157, 158 not coated with material. This facilitates their easy removal from the pedal crank body 2 through an unscrewing operation. The removal is also helped by the presence of the detachment-enhancing material with which the master elements 144, 146 had been coated before molding as well as by a partial detachment of the material 148 due to the heat shrinking of the materials in the cooling step. The removal of the master elements 144, 146 creates a semi-worked product comprising a pedal crank body 2 made totally from set material formed from structural fibers with two threaded seats 4, 5.

Figure 11:
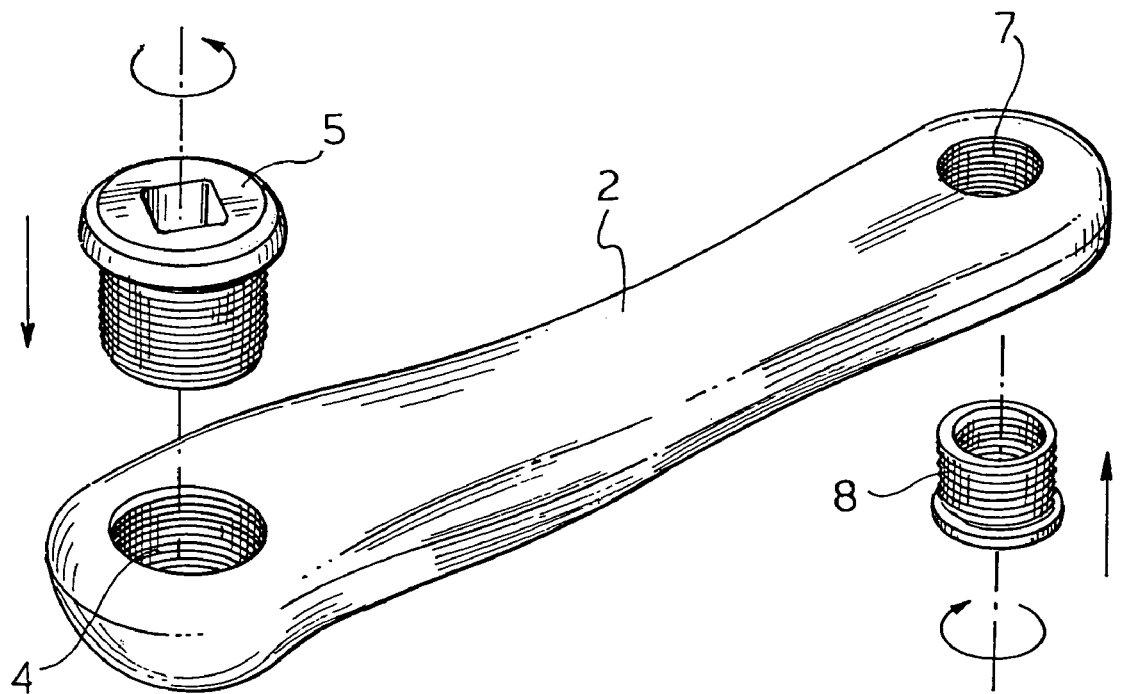

FIG. 11 shows the next steps: first, coating the inserts 5, 8 with a layer of gluing substance, preferably a bicomponent epoxy resin and second, inserting the respective threaded inserts 5, 8 (the inserts have the geometry shown in FIGS. 3A and 3B). When the insert is screwed in, the gluing substance fills the interspace 15, 16 defined between the seat 4, 7 and the insert 5, 8. The threads closest the head of the insert firmly engage the insert 5, 8 in the seat 4, 7 due to the coupling without clearance made by the contact threads 13a, 14a with the threaded hole 11, 12.

The next step is drying the gluing substance, which can take place at room temperature or possibly through heating, until the glue polymerizes.

The final step involves making suitable holes 9, 10 in the inserts 5, 8 for connection to the bottom bracket pivot and to the pedal according to known processing techniques with machine tools.

Advantageously, the described method allows the cohesive force between the inserts and the pedal crank body to be improved thanks to their particular geometry. The inserts are preferably inserted into the seats when they are already formed, with the polymeric material already reticulated and hardened, which allows for an ideal interference coupling.

Another advantage is that the described method allows the cohesive force between the inserts and the pedal crank body to be improved through the use of the glue. The glue is preferably applied and left to dry when the pedal crank body and the inserts are already formed. They do not, therefore, undergo any shrinkage during the polymerization of the glue.

Variants of such a method foresee the use of different shaped master elements, i.e. shaped so as to allow the manufacture of the respective seats according to the desired geometries. The manufacture of the seat 61 represented in FIG. 3B, for example, could comprise a master element having a cylindrical element with variable profile threading according to the profile shown in the Figure.

It can also be foreseen that in a further step of the described method, after the insert is inserted in the respective seat, the end opposite the widened head undergoes a drawing operation to create an undercut zone which prevents the insert from coming out from the seat itself.

In another variant of the described method, the seats could be formed by processing with machine tools starting from a monolithic pedal crank body obtained, for example, through molding with the described method, in which, however, the master elements are missing.

In a further variant the molding could foresee the use of layers of material suitably arranged inside the mould for shaping the pedal crank. Such layers can consist of structural fibers arranged according to a unidirectional configuration, or else wefted in the form of fabric, inside the matrix of polymeric material. This allows particular physical-mechanical characteristics of the pedal crank to be obtained along predetermined directions.

It should be noted that the shape of the master elements substantially mirrors the shape of the inserts and is slightly larger than them in at least one portion to allow, when the insertion is completed, the creation of the interspace for receiving the gluing substance.

Moreover, when the pedal crank is mounted on the bicycle, it can be foreseen to apply a removable covering element of the insert to improve the appearance of the pedal crank.

Finally, the shape of the seats and of the metal inserts can be any combination of the illustrated shapes. For example, all the shapes illustrated can be tapered, or else can have a first part with decreasing sections (frusto-conical or frusto-pyramidal) and an end part with constant sections (cylindrical or prismatic). Moreover, in the frusto-conical-cylindrical shape there can be a threading in the cylindrical part or in its end part. Finally, the inner surfaces of the seats and/or outer surfaces of the inserts can be made up of any combination of curved areas and flat areas.

What is claimed is:

1. A force transmitting bicycle component comprising:
   a body of structural fibers incorporated in a matrix of polymeric material that has at least one seat with spaced apart ends that define a recess having a mouth at a first end, a base at a second end and a wall extending between the first and second ends that includes at least two body attachment zones; and at least one metal insert that fits within the seat creating at least two insert attachment zones, one of said at least two insert attachment zones is dimensioned to complement one of the body's at least two attachment zones in an interference fit and a remaining one of said at least two insert attachment zones is dimensioned to define a gap between itself and a remaining one of said at least two body attachment zones, wherein said at least one metal insert is configured to connect to a bottom bracket of a bicycle and has a widened head portion that abuts and extends beyond an outermost surface of said body.

2. The component of claim 1 wherein the seat and the insert are mechanically coupled using coupling surfaces that are prism shaped.

3. The component of claim 1 wherein the seat and the insert are mechanically coupled using coupling surfaces in the seat and the insert that are tapered.

4. The component of claim 1 wherein the seat and the insert are mechanically coupled using coupling surfaces in the seat and the insert that are frusto-conical shaped.

5. The component of claim 1 wherein the seat and the insert are mechanically coupled using coupling surfaces in the seat and the insert, the surfaces having one or more grooves.

6. The component of claim 5 wherein the grooves extend longitudinally from the mouth to the base of the seat.

7. The component of claim 1 wherein the at least two insert attachment zones have, in at least one portion thereof, an outer thread.

8. The component of claim 1 wherein the seat and the metal insert are mechanically coupled using cylindrically shared coupling surfaces, and the coupling surface of the seat has, in at least one portion thereof, an inner threading defined on the base of the seat and the end part of the insert is also threaded.

9. The component of claim 1 wherein the at least two insert and body attachment zones are threaded.

10. The component of claim 1 wherein said one of said at least two insert attachment zones that forms said interference fit comprises one or more contact threads having a greater average, outer and core diameter with respect to threads of said one of said at least two insert attachment zones that forms said gap.

11. The component of claim 1 wherein said one of said at least two insert attachment zones that forms said interference fit is placed near an end of said metal insert arranged at an opposite end of said metal insert from said one of said at least two insert attachment zones that forms said gap.

12. The component of claim 1 wherein the seat and the metal insert are mechanically coupled using cylindrically shaped coupling surfaces on the seat and the insert, the coupling surface on the seat has, in at least one portion thereof, an inner threading defining a threaded hole that has a first coupling zone without clearance with the screw portion and a second coupling zone that has an interspace that is a gap between the insert and the threaded hole.

13. The component of claim 12 wherein the first zone comprises one or more contact threads having an average, outer and core diameter smaller than the threads of the second zone.

14. The component of claim 12 wherein the first zone is located nearer to the base than the mouth.

15. The component of claim 1 wherein said base of said seat opens onto an outer surface of the body defining a through-hole configuration for said seat.

16. The component of claim 1 wherein said base of said seat is confined to the inside of said body of the component.

17. The component of claim 1 further comprising a removable covering element that covers the metal insert.

18. The component of claim 1 wherein an adhesive contacts said seat and said metal insert.

19. The component of claim 18 wherein the gluing substance consists of a bicomponent epoxy resin.

20. The component of claim 18 wherein said walls of the seat and an outer surface of said metal insert define an interspace suitable for receiving said adhesive.

21. The component of claim 20 wherein said interspace has a substantially uniform width.

22. The component of claim 21 wherein said width of the interspace is between 0.1 and 0.05 mm.

23. The component of claim 1 wherein the structural fibers are randomly arranged inside the matrix of polymeric material.

24. The component of claim 1 wherein the structural fibers are arranged in an ordered manner inside the matrix of polymeric material.

25. The component of claim 1 wherein the structural fibers are chosen from the group consisting of: carbon fibers, glass fibers, aramidic fibers, ceramic fibers or any combination thereof.

26. The component of claim 1 wherein the metal insert comprises a light alloy.

27. The component of claim 26 wherein the light alloy is aluminum.

28. The component of claim 1 wherein the component is a pedal crank comprising:

a second seat at an opposite end of the crank from said at least one seat where a second metal insert is received for connection to a bicycle pedal.

29. The component of claim 28 wherein the at least one insert has a connection hole to the bottom bracket and the second insert has a connection hole to the pedal.

30. The component of claim 28 wherein the pedal crank comprises a third seat and a third insert for the anchoring of a crown associated with the pedal crank.

31. The component of claim 30 wherein the third insert is arranged in an intermediate position between the first insert and the second insert.

32. The component of claim 28 wherein the pedal crank comprises one or more arms which extend radially with respect to the first seat and anchor a crown associated with the pedal crank.

33. The component of claim 32 wherein the arms comprise seats and inserts for the anchoring of the crown.

34. A force transmitting bicycle component comprising:

a body of structural fibers incorporated in a matrix of polymeric material that has at least one seat with spaced apart ends that define a recess having a mouth at a first end, a base at a second end and a wall extending between the first and second ends that includes at least two body attachment zones; and at least one metal insert that fits within the seat creating at least two insert attachment zones, one of said at least two insert attachment zones is dimensioned to complement one of the body's at least two attachment zones in an interference fit and a remaining one of said at least two insert attachment zones is dimensioned to define a gap between itself and a remaining one of said at least two body attachment zones, wherein said at least one metal insert is configured to connect to a bottom bracket of a bicycle, said base of said seat opens onto an outer surface of the body defining a through-hole configuration for said seat, and said metal insert has a widened head portion that abuts and extends axially outward from the outer surface of said body.

35. A bicycle crank comprising:

an elongated body, formed of structural fibers incorporated in a matrix of polymeric material, having first and second ends and first and second sides;

at least one seat, defining an opening at one end of the body that extends between the sides and defines a mouth on one of the sides and a base on the other side, having walls that are substantially uniform between the mouth and the base; and at least one metal insert comprising a first coupling zone that substantially engages one end of the opening and a second coupling zone defining an interspace that is a gap between the insert and the other end of the opening, wherein said at least one metal insert has a widened head portion that abuts an outermost surface of said body, and extends axially outward from a plane formed by said outermost surface of said body.

36. A bicycle component comprising a body made from structural fibers incorporated in a matrix of polymeric material, the body comprising:

at least one seat having an opening therein, the opening comprising:

a mouth at a first end of the opening;

a base at a second end of the opening opposite the first end being of a size not greater than the size of the mouth end; and walls with cross-sections that do not increase from the mouth to the base; and at least one metal insert that engages the seat;

wherein at least a portion of the metal insert extends axially outward from the body.

37. A force transmitting bicycle component comprising:

a body of structural fibers incorporated in a matrix of polymeric material that has at least one seat with spaced apart ends that define a recess having a mouth at a first end, a base at a second end and a wall extending between the first and second ends that include at least two attachment portions;

at least one metal insert that fits within said seat and includes at least two attachment portions and a head portion, one of said at least two attachment portions is dimensioned to complement one of the body's attachment portions in an interference fit and a remaining one of said at least two attachment portions is dimensioned to define a gap between it and a remaining one of said at least two body attachment portions, the head portion configured to abut the body at a location radially outward of the mouth of the recess, and extend axially outward from an outermost surface of the body; and, an adhesive within said gap between said respective body and insert attachment portions.

* * * * *